United States Patent
Mühlen et al.

(10) Patent No.: US 7,077,878 B1
(45) Date of Patent: Jul. 18, 2006

(54) METHOD FOR GASIFYING ORGANIC MATERIALS AND MIXTURES OF MATERIALS

(75) Inventors: Heinz-Jürgen Mühlen, Münster (DE); Christoph Schmid, Bergneustadt (DE)

(73) Assignee: Dr. Mühlen GmbH & Co. KG, Herten (DE)

( * ) Notice: Subject to any disclaimer, the term of this patent is extended or adjusted under 35 U.S.C. 154(b) by 742 days.

(21) Appl. No.: 10/089,012

(22) PCT Filed: Sep. 22, 2000

(86) PCT No.: PCT/EP00/09275

§ 371 (c)(1),
(2), (4) Date: Mar. 25, 2002

(87) PCT Pub. No.: WO01/21730

PCT Pub. Date: Mar. 29, 2001

(30) Foreign Application Priority Data

Sep. 24, 1999 (DE) ................................ 199 45 771

(51) Int. Cl.
*C01B 3/24* (2006.01)
(52) U.S. Cl. ............................. 48/198.1; 48/61; 48/62; 48/71; 48/72; 48/77; 48/200; 48/201; 48/202; 48/144; 48/145; 48/146; 48/147
(58) Field of Classification Search .................... 48/61, 48/62, 71–77, 98–101, 197, 200–202, 144–147; 422/188–190, 198–203, 232–235
See application file for complete search history.

(56) References Cited

U.S. PATENT DOCUMENTS

| 3,738,103 | A | * | 6/1973 | Rudolph et al. | ............... 60/649 |
| 4,038,100 | A | * | 7/1977 | Haberman | .................. 106/472 |
| 4,110,193 | A | * | 8/1978 | Gwyn et al. | ................. 208/410 |
| 4,568,362 | A | * | 2/1986 | Deglise et al. | ................. 48/209 |
| 5,262,577 | A | * | 11/1993 | Velcich | ........................ 585/240 |
| 5,662,052 | A | * | 9/1997 | McIntosh et al. | ........... 110/346 |

FOREIGN PATENT DOCUMENTS

| DE | 533 710 | 5/1958 |
| DE | 971 789 | 3/1959 |
| DE | 10 90 632 | 10/1960 |
| DE | 40 18 391 | 12/1991 |
| DE | 197 55 693 | 7/1999 |
| WO | WO99/31197 | 6/1999 |

OTHER PUBLICATIONS

Olsen et al., Unit Processes & Principles of Chemical Engineering, pp. 1-3 (1932).*

* cited by examiner

*Primary Examiner*—Glenn Caldarola
*Assistant Examiner*—Vinit H. Patel
(74) *Attorney, Agent, or Firm*—Collard & Roe, P.C.

(57) ABSTRACT

The aim of the invention is to provide a method for gasifying organic materials which is simple to carry out and requires minimal equipment and which produced an undiluted gas of high calorific value. The inventive method should eliminate the need to use fluid beds and heat exchangers with high temperatures on both sides, with the heat being transferred from the furnace to a heat-carrying medium in a particularly defined way. To this end, the feed material is divided into a volatile phase and a solid carbon-containing residue in the pyrolysis reactor by circulating a hot heat-carrying medium. After the reaction agent has been added, said volatile phase is converted into the product gas by further heating in the reaction area, also using the heat-carrying medium. The solid, carbon-containing residue is separated from the heat-carrying medium in the separating stage and burnt in the furnace. The heat-carrying medium is heated by the waste gases of the furnace in the heating area and then returned to the reformer and then the pyrolysis reactor.

20 Claims, 2 Drawing Sheets

METHOD FOR GASIFYING ORGANIC MATERIALS AND MIXTURES OF MATERIALS

CROSS REFERENCE TO RELATED APPLICATIONS

Applicants claim priority under 35 U.S.C. §119 of German Application No. 199 45 771.9 filed Sep. 24, 1999. Applicants also claim priority under 35 U.S.C. 365 of PCT/EP00/09275 filed Sep. 22, 2000. The international application under PCT article 21(2) was not published in English.

BACKGROUND OF THE INVENTION

1. Field of the Invention

The invention relates to a method for gasifying organic materials and mixtures of materials as defined in the invention.

2. The Prior Art

A process for gasifying organic substances and mixtures of substances is known from U.S. Pat. No. 4,568,362 (1), in which the organic substances are admitted into a pyrolysis reactor, in which these substances come into contact with a heat-carrying medium. Such contact leads to a high rate of pyrolysis and the substances are converted into pyrolysis products, i.e. pyrolysis gases containing condensable substances and solid, carbon-containing substances. The thermal energy required for the pyrolysis stage is generated by combusting the solid, carbon-containing residue. In a second reaction zone, the tar-containing pyrolysis gases are subjected to cracking reactions and reaction with steam in such a way that a gas product with a high calorific value is obtained.

In said process, both the pyrolysis and the combustion of the solid, carbon-containing residue take place in a fluidized bed. In the upper part of the fluidized-bed pyrolysis reactor, provision is made for a reaction zone for the tar-containing pyrolysis gases. The heat-carrying medium is partially discharged together with the solid, carbon-containing residue via the reactor head of the fluidized-bed reactor, and the remaining part is discharged via a conduit arranged at the borderline of the upper fluidized bed, and supplied to the firing stage of the fluidized bed. There, the solid, carbon-containing residue is burnt, and the heat-carrying medium is heated up. The heated-up heat-carrying medium and the ash are jointly discharged with the exhaust gas from the fluidized-bed firing stage, separated in a gas/solids separator located above the fluidized-bed pyrolysis reactor, and supplied to the reaction zone of the pyrolysis reactor, from where they drop again into the fluidized bed of the pyrolysis reactor (=the heat-carrying medium circulation).

The operation of such fluidized beds, however, requires a substantial amount of expenditure, and it is hardly possible to exert any influence on the reactions of the pyrolysis gases occurring in the reaction zone. Furthermore, highly superheated steam has to be used in the reaction zone, which in turn requires the use of water that has been treated at substantial expenditure.

A process for gasifying organic substances and substance mixtures is known from DE-PS 197 55 693 (2). In this process, the organic substances are brought into contact with a heat-carrying medium in a migrating-bed reactor, which leads to rapid pyrolysis, with conversion of the organic substances into a carbon-containing, solid residue, on the one hand, and a pyrolysis gas that consists of condensable volatiles and gaseous components on the other.

The heat-carrying medium and the pyrolysis coke are subsequently supplied to a combustion stage, in which the carbon-containing residue is burnt, on the one hand, and the heat-carrying medium is heated up, on the other hand, before it is recycled into the pyrolysis stage.

After adding a reactant, which is steam, as a rule, the tar-containing pyrolysis gas is after-heated in a second reaction zone realized in the form of an indirect heat exchanger in such a way that a gas product with high calorific value is obtained. The heat exchanger takes place is indirectly heated by means of the combustion gases as the latter are being cooled. Following the firing process, the ash is separated from a partial stream of the mixture consisting of the heat-carrying medium and the ash of the solid, carbon-containing residue, and then cooled and discharged.

Said process, however, has a number of aspects that make a device for carrying out this process complicated in terms of the required expenditure and costly as well, and may also have an adverse influence on the operation and on the availability as well. First of all, the heat-carrying medium in transported in the heated state from the combustion stage back into the pyrolysis stage, i.e. at a temperature that is by far above the pyrolysis temperature, which is specified to amount to from 550° to 650° C. This makes it imperative to employ special conveying means that require a particularly high amount of expenditure in terms of material and mechanically speaking. Furthermore, to the extent to which the heated heat-carrying medium is still mixed with ash, it has to be expected that the latter will escape and thus cause baking problems. Secondly, the indirect heat exchanger, owing of its operating conditions that include temperatures of from 500° to 1000° C. on both sides, requires reducing conditions, on the one hand, and because of the highly corrosive components contained in both in the pyrolysis product and product gas and in the combustion exhaust gas as well, requires materials that require substantial expenditure, as well as an additional purification system that also may require much expenditure because of softening of the ash may possibly occur, on the other hand. The risk of ash baking to surfaces in the heat exchanger sets narrow limits for the operation and design of the firing stage as well. A further problem is encountered when steam is added to the pyrolysis gases: the steam is either superheated, which requires a great amount of expenditure, or the temperature is lowered, which may lead to condensation of tar and consequently to baking problems. Finally, situations are conceivable in which it is not possible to assure a defined heat transfer into the heat-carrying medium as it is heating up again in the firing process, so it has to be feared that the pyrolysis coke and the heat-carrying medium are de-mixed in the firing stage, so that, for example in the case of a grate firing process, the pyrolysis coke is burnt off on the layer on top, whereas the heat-carrying medium may still be cooled by the current of grate air streaming in through the grate from the bottom.

SUMMARY OF THE INVENTION

The invention is based on the problem of providing a method that can be carried in a simple way for producing a high-quality and undiluted product gas with a high calorific value; with low expenditure for the equipment; and in which, furthermore, the use of fluidized beds or heat exchangers having high temperatures on both sides is avoided, and in which the heat is transferred from the firing stage into the heat-carrying medium in a particularly defined manner.

Said problem is solved by the combination of features specified in the invention. In a manner similar to (2), the basic idea of dividing the method in three steps of the process that can be carried out in simple way, is pursued further as follows: rapid pyrolysis, recovery of the product gas from the pyrolysis gases after process steam has been added to the homogeneous gas phase reactions with feed of heat; and generation of the heat required for the pyrolysis and initiation of the reactions of the gas phase by combusting pyrolysis coke of a solid, carbon-containing residue. However, a substantial expansion of the idea is represented by the fact that the heat of the firing stage is transferred into the heat-carrying medium in a defined and forcible manner, because if the pyrolysis coke and the heat-carrying medium are admitted into the firing stage in the form of a mixture, as it has been described in (2), it has to be expected that de-mixing of the heat-carrying medium and the pyrolysis coke will occur, for example on a combustion grate, so that the heat-carrying medium will not only be heated up inadequately in the course of the combustion process, but will even be cooled by the current of combustion air streaming in through the grate. A defined and enforced heat transfer is conceivable only in a rotating tubular furnace because the solids are intensively mixed there beyond the stoking effect of a grating. However, in conjunction with the present method, a rotating tubular furnace would represent a very costly firing system with poor admixture of the air, while a fluidized bed is disregarded for the reasons stated above.

Therefore, according to the invention, the mixture comprised of the pyrolysis coke and the heat-carrying medium is separated immediately after it has exited from the pyrolysis reactor; and the pyrolysis coke is then transferred into the firing stage, whereas the heat-carrying medium is conveyed into a heating-up zone, through which it flows in the form of a fill of hot flue gas and where it is heated up in that way in a defined manner. Two aims are achieved by de-coupling the combustion of the pyrolysis coke in that way, on the one hand, and by heating up the heat-carrying medium on the other: the combustion of the pyrolysis coke can be completely adapted to the requirements of this fuel, on the one hand, i.e., it is basically made possible again to consider any type of firing. According to the method as defined by the invention, it is made possible, on the other hand, to shift the zone for heating up the heat-carrying medium to any desired location of a plant, so that the mechanical transport of the heat-carrying medium—which has been heated up to the maximum process temperature—is replaced by the comparatively simple transport of a hot exhaust gas coming from a firing stage; and the heat-carrying medium with the lowest process temperature, which is the temperature at the base after exiting from the pyrolysis reactor, is transported into the zone, where it is heated up again.

According to the invention, the pyrolysis of the organic substance is carried out in a reactor that permits converting the heat required for the heating up, and the drying steps and the pyrolysis to be carried out in a manner as effectively as possible, in conjunction with the greatest possible simplicity in terms of equipment requirements, and a robust mode of operation. Consequently a migrating bed-type reactor or a rotating drum are considered for this task, as a rule. The pyrolysis temperature will then preferably be in a range of from 500° to 650° C.

The type of separation method employed for separating the pyrolysis coke and the heat-carrying medium is dependent upon the quality of the heat-carrying medium, and may be carried out in different ways. A mechanical separation can be carried out, for example by means of a two-stage screening process. In such a screening process, the favorable effect is that the temperature of the media to be separated amounts to only about 500° to 600° C., so that it is possible to use materials that are currently available on the market. The separation by screening in two stages is considered if the heat-carrying medium consists of medium-sized particles within a narrow grain size spectrum. The heat-carrying medium is extracted in this screening process in the form of medium-sized material, whereas the pyrolysis coke is extracted in the form of coarse or fine material. As long as the two screening steps are carried out adequately close to each other, only rather minor amounts of pyrolysis coke will be getting into the heat-carrying medium, proportionately speaking, where this causes no disturbance, as a rule. Another possibility is the use of a heat-carrying medium with magnetic properties, for example such as steel balls, which can be separated from the mixture with the help of a magnet. However, it has to be noted in this connection that magnetic separation of hot bulk materials is not as yet feasible with the components usually found in the market. Finally, the possibility of wind sifting is available provided the heat-carrying medium has adequate density. It is possible to use the combustion air as a sifting fluid medium; however, the medium is preferably a flue gas that has been recycled as a partial stream for safety reasons. It is recommended in such a case that the firing stage be located very close to the separation stage. The firing stage should, in this case, advantageously make use of the fluidization or dispersion of the fuel in the carrier gas, and should be, for example a cyclone firing process.

By separating the heat-carrying medium and the pyrolysis coke, the type of firing used is rendered almost insignificant. However, a few marginal conditions do in fact apply: On the one hand, at the given temperature of the reforming process, the flue has to be discharged at the end of the firing process with a temperature that takes into account the loss of heat incurred on the way to the heating-up zone; the concentration of the heat transfer to the heat-carrying medium within the heating-up zone, and the concentration of the heat-carrying medium when the heat is transferred into the second reaction zone in the course of the reforming process. If, for example, the temperature of the reforming stage comes to 1000° C., the heat-carrying medium should have a hot temperature about 1050° C. when in enters said zone. This can be achieved with hot flue gas having a temperature of 1075° C. provided the heating-up zone is conceived accordingly. So as to cover the loss of heat occurring on the way from the firing stage to said heating-up zone, the flue gas has to be slightly hotter when it exits from the firing stage, i.e. it should have a temperature of, for example 1100° C. On the other hand, it is often necessary to maintain certain marginal conditions with respect to the mineral component of the pyrolysis coke. For example, melting or sintering of the ash does nor have to be excluded, basically speaking; however, the ash, as a product, may require to be extracted in the dry state while avoiding any softening during such extraction, for example when chicken manure is gasified and the produced ash is to be used as a highly effective, valuable fertilizer. In such cases, it is possible to use, for example a stepped combustion process in an operation below the stoichiometric level of proportion, in which complete burning is achieved and the required temperature is thus generated only if secondary air is added. It has to be mentioned here also that in cases where the pyrolysis coke produced will not suffice for generating the process heat, product gas can be added to the firing stage.

The second reaction zone now included in the circulation of the heat-carrying medium represents the second important supplementation. The reforming process takes place in direct contact with the heat-carrying medium according to the known reactions with steam, for example according to:

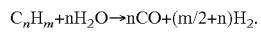

$$C_nH_m + nH_2O \rightarrow nCO + (m/2+n)H_2.$$

Baking due to the possible formation of carbon black and other cracking processes is now made tolerable in this way because owing to the circulation of the heat-carrying medium, the heat-transferring surfaces are always regenerated time and again. The consequence of including the second reaction zone in the circulation of the heat-carrying medium is reflected by a substantial expansion of the circulation of the heat-carrying medium.

According to the invention, the method of the invention opens up at least two basic possibilities for controlling the circulation of the heat-carrying medium. With respect to the heat-carrying medium, it is possible to successively connect the second reaction zone and the pyrolysis reactor one after the other, in series or in parallel. The important advantage offered by the series connection lies in the simplicity of the equipment: the heating-up zone, the second reaction zone and the pyrolysis reactor are interconnected among each other, so that the heat-carrying medium is moving through this arrangement, driven by force of gravity from the top downwards. Versus the arrangement described in (2), the pyrolysis stage has been changed to the extent that the pyrolysis no longer needs to be carried out with a very much greater amount of heat-carrying medium having, however, a distinctly lower temperature. If, for example, the heat-carrying medium enters the second reaction zone for the reforming purpose with a temperature of around 1050° C., it will exit from said zone while still having temperature of only about 750° C. With the parallel connection, the pyrolysis stage is not changed vis-à-vis the arrangement described in (2). However, a higher expenditure in terms of equipment has to be expected due to the fact the hot stream of heat-carrying medium has been divided, allocating it to the pyrolysis reactor and the second reaction zone, and is subsequently united again. The parallel connection, therefore, has to be given preference in cases in which it is advantageous if the charged material comes into contact with particularly hot heat-carrying medium.

Finally, the addition of process steam to the pyrolysis gases prior to the reforming step is carried out in the second reaction zone. This is addressed in the following as well. The process steam has to be admixed in an excess amount with respect to the homogeneous reactions occurring in the gas phase that have to be expected to occur, because any possible formation of carbon black can be consequently suppressed only in this way. A basis for this consists in maintaining a defined steam concentration in the fresh product gas, specifically amounting to, for example 20% by volume or more. On the other hand, it has to be expected that controlling the addition of process steam quantitatively with a steam concentration serving as the measuring quantity will require a great deal of expenditure and will be costly. It is deemed to be better to adjust a fixed value that is controlled via a measurement of the quantity depending on the capacity, which possibly may be carried out in any case. One possibility for realizing the method as defined by the invention that needs to be mentioned in any case lies in the selection of the site where the process steam is mixed with the pyrolysis gas. This mixing process has to take place prior to the entry of the mixture into the second reaction zone of the reformer at the latest; however, said site may be shifted upstream to the pyrolysis reactor, and there to any desired location within the pyrolysis reactor situated up to its lower end. The lower end of the pyrolysis reactor is meant in this connection to be the site from where the mixture comprising the heat-carrying medium and the solid, carbon-containing residue exits. This does change the division of the heat realized between the pyrolysis and the reforming stages; however, flushing of the pyrolysis with steam, which is added within the vicinity of the site where the solids exit from the pyrolysis reactor, offers advantages in the last analysis under a number of aspects: firstly, the temperature of the pyrolysis gas is not lowered in this way at any point on its way to the second reaction zone, so no condensation has to be expected to occur. Secondly, it is known from (3) that it is possible to increase the yield of volatile components in the pyrolysis of biomasses by rinsing with steam. This can be advantageous because an excessively high yield of solid pyrolysis product beyond the heat requirement of the method will reduce the yield of product gas and in connection therewith the degree of efficiency of the cold gas. Thirdly and finally, this constitutes a preventive measure for avoiding possible leakage of pyrolysis gas in the direction of the separation stage, where the heat-carrying medium and the pyrolysis gas are separated.

DETAILED DESCRIPTION OF PREFERRED EMBODIMENTS

Figure 1:
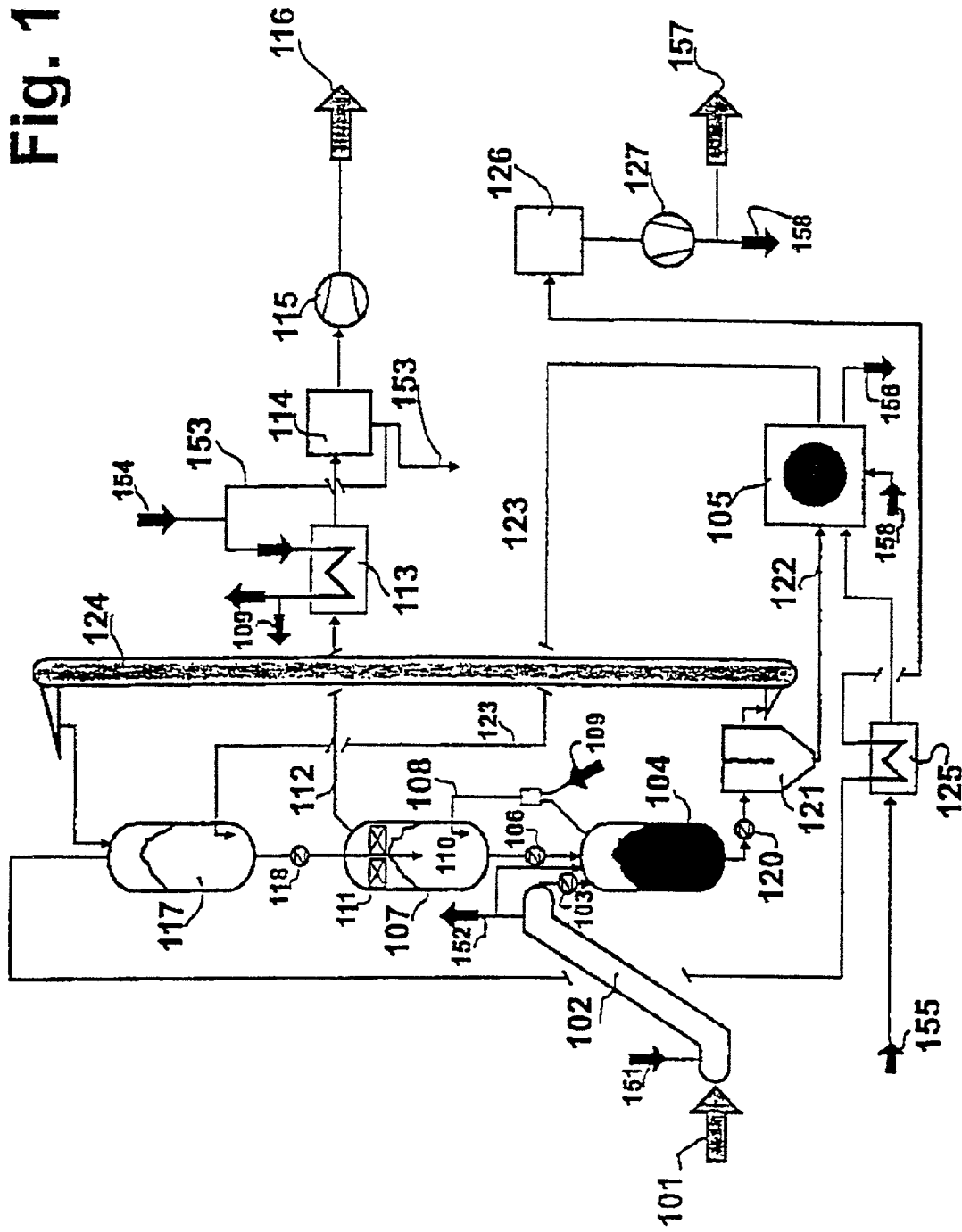
FIG. 1 shows a first embodiment of the present invention.

FIG. 1 shows a possible embodiment of the object of the invention. This embodiment relates to the arrangement of the series connection described in the foregoing, in which the heating-up zone, the second reaction zone (the reformer) and the pyrolysis reactor are successively connected one after the other from the top down. The charged material 101 is supplied to the pyrolysis reactor 104 via a conveyor system 102 and the gate 103. The conveyor system 102 is a conveyor screw, a belt conveyor or a similar system that may be heated, whereby the low-temperature heat 151 obtained by exploiting the off-heat of the exhaust gas and the product gas (see farther below) can be advantageously used specifically for raising the overall degree of efficiency. If an open system is used, the vapors 152 are exhausted into the environment, or otherwise added either to the pyrolysis reactor 104 or the firing stage 105. Adding the vapors to the pyrolysis reactor 104 has the advantage that a lesser amount of process steam needs to be supplied. However, it is, technically speaking, simpler if the vapors are added to the firing stage 105, because the latter is operated under a low vacuum. The pyrolysis reactor 104 is preferably designed in the form of a cylindrical shaft reactor. In addition to the charged material, the heat-carrying medium coming from the second reaction zone (=the reformer) 107 is dropping into said reactor via the gate 106 as well. The latter may have any desired type of construction; however, it is advantageously realized in the form of a bucket wheel gate or cycled thrust gate and needs not to be gas-tight.

The path followed by the expelled volatile components downstream is now described in the following first. The volatile components exit from the pyrolysis reactor 104 in mixture with the added process steam 109 via a separate conduit 108 and travel in the direction of the second reaction zone 107. Travelling via the gate 106, which thus omits the separate conduit 108, would be basically feasible as well, notably if the gate could be realized in a permeable form in such a way that it would be permeable to gas at any time without any restrictions, whereas the heat-carrying medium is permitted to enter the pyrolysis reactor 104 only in metered amounts or within the framework of the gating process, because while the heat-carrying medium is permitted to enter the pyrolysis reactor 104 only in metered amounts, with the possibility for interrupting the feed entirely, the total amount of the pyrolysis gas, in addition to the admixed process steam 109, has to be permitted to escape without being obstructed in any way. By suitably designing the bottom of the second reaction zone (=the reformer) 107 accordingly, the stream of the volatile components coming from the pyrolysis stage will pass through the fill of heat-carrying medium present in the reformer over as long a distance as possible. The heat-carrying medium is moving from the top down countercurrently in relation to the gas mixture, which is reacted to product gas while being heated up, and which is cooled on its way. For supporting the conversion process, the catalyst 111 in the form of a fill, or preferably in the form of a honeycombed packing, may be present in the upper part of the reformer 107. It is important that the catalyst 111 is located at the top, hot end of the reformer 107, because the product gas being formed is still unpurified at this point and may consequently still contain a number of catalyst toxins such as, for example sulfur depending on the charged stock material 101. However, many catalysts such as, for example the ones based on nickel, may be rendered more insensitive or may even be regenerated or "burnt free", which could be achieved in the reformer 107 in a very simple way, for example by adding from time to time small amounts of air, whereby, however, a loss of product quality would have to be accepted during the time periods in which air is added. The product gas stream 112 exits from the reformer 107 in the upward direction. At the same time, the highest temperature is present at that point throughout the entire distance over which the pyrolysis gas or the product gas is travelling, so that the sensible heat of the product gas stream 112 should be exploited in any case. This can be accomplished in an advantageous way within the off-heat vessel 113. At least a portion of the steam generated there can then be recycled again into the process in the form of the process steam 109. After exploiting the off-heat, the raw product gas enters the purification and conditioning stage 114. The mode of operation of the latter is adapted to the subsequent purpose of application intended for the product gas, and is known per se. The purification stage 114 comprises at the same time conditioning of the aqueous condensation product obtained there, as a rule, by cooling the product gas. The adjustment of the pressure in the pyrolysis reactor 104, which preferably is a low vacuum, as well as the transport of the product gas and its preliminary runnings are handled by the ventilator 115. The purified product gas stream 116 exits from the plant system downstream of the ventilator 115. The condensation product stream 153, which possibly may be conditioned, if need be, can now be supplied to the off-heat vessel 113 as the feed water, or can be evaporated in the firing stage 105, so that it is basically possible to control the process overall in a manner free of waste water. The possibility for supplying the condensation product to the firing stage consists in that the condensation product is supplied to the separation stage 121, which is described farther below, and evaporated under cooling of the heat-carrying medium or the carbon-containing residue, and the vapors are supplied to the firing stage. If the sensible heat is to be used to a very high extent, and steam may possibly have to be supplied to external consumers (which includes external conditioning of the stock material charged, or possibly internal conditioning in the conveyor 102 as well), it is recommended that only the fresh water 154 alone is used as feed water, whereas the condensation product 153 is discarded or "burnt" as completely as possible.

The path followed by the heat-carrying medium and the pyrolysis gas is described further as follows: The mixture comprising the heat-carrying medium and the pyrolysis gas passes through the gate and conveyor unit 120 and enters the separation stage 121. The mode of operation of the latter, which is working mechanically by means of screening or sifting, or magnetically, has already been described above. The separated pyrolysis coke stream 122 is subsequently received in the firing stage 105, and received there immediately in the best way. It is burnt there with the combustion air 155 to a hot exhaust gas, which is conveyed via the hot gas conduit 123 to the heating-up zone 117 (=the preheater) for heating up the heat-carrying medium. The possibilities for decoupling the temperature in the burnt material and the temperature of the flue gas from each other via the excess air or the recycled flue gas, as well as for a stepped combustion process are known, so that de-ashing can be carried out in a dry way in spite of the required flue gas temperature. These possibilities are therefore not addressed here at greater length. What remains to be addressed is the ash/slag stream 156, which exits from the firing stage to the outside and is cooled on its way, if necessary.

The heat-carrying medium is directed transported to the preheater 117 by means of the conveyor system 124. The conveyor system has to designed in such a way that it is capable of transporting hot material in a careful way, mechanically speaking, while minimizing the loss of heat. The use of a bucket conveyor system, a tubular chain conveyor or a bucket elevator system is primarily thought of in this connection.

In the present embodiment as defined by the invention, the preheater 117 is arranged directly on top of the reformer 107 and separated from the latter on the gas side by the gate 118. Said gate has to be gas-tight the highest possible degree, so that no mixing of flue gas and product gas will occur. No special requirements have to be satisfied with respect to the type of construction of the gate 118 used. Analogous to the reformer 107, the exhaust gas flows through the preheater from the bottom to the top countercurrently in relation to the heat-carrying medium. The latter enters the preheater 17 at the top at the base temperature of the process of about 500° C. Said base temperature follows from the final pyrolysis temperature less a temperature reduction due to heat losses. If the preheater 117 is provided with an adequately large size (the same applies to the reformer 107), the conveyor system 124 as well as the gate elements 118 and 106 are capable of operating almost discontinuously in any desired way.

The off-gas exits from the preheater 117 at a temperature slightly above the temperature prevailing at the base. As a rule, the amount of off-gas is distinctly larger than the amount of the product gas. The use of the off-heat of the exhaust gas after it exits from the preheater is consequently urgently recommended in the present case. This is preferably accomplished by preheating the combustion air in the air preheater (LUVO) 125, because the recovered heat can be used again in this way in the following combustion stage, and is available above the base temperature of approximately 500° C. This type of shifting of the heat cannot be produced in the way of steam generation or only so with a disproportionately high amount of expenditure. The purification stage 126 and the suction blower 127, which have to be configured depending on the material being processed and in light of the applicable restrictive emission regulations, their modes of operation being known per se, are arranged downstream of the air preheater (LUVO) 125. The purified exhaust gas 157 is released into the environment, as a rule, whereby a partial stream 158 can be recycled into the firing stage 105 for the purpose of superior temperature control.

Figure 2:
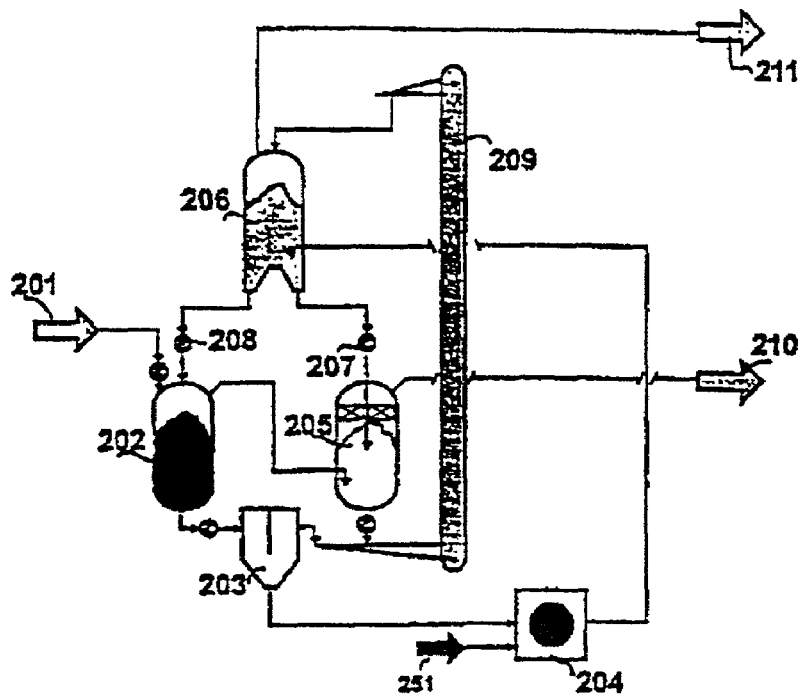
FIG. 2 shows a modified portion of the system shown in FIG. 1.

FIG. 2 shows in a simplified manner the core of the plant in terms of process engineering on the side of the heat-carrying medium in the parallel arrangement of the second reaction zone (=the reformer) and the pyrolysis reactor. The path followed by the charged material 201 through the pyrolysis reactor 202 and the separation stage 203 to the firing stage 204 (combustion air 251) remains essentially the same. However, in the present embodiment, the reformer 205 is located next to the pyrolysis reactor at about the same level, and the preheater 206 representing the heating-up zone is installed above the pyrolysis reactor 202 and the reformer 205. The maximally heated heat-carrying medium is conveyed in parallel into the reformer 205 and the pyrolysis reactor 202 from the preheater 206 and by way of the now-two indicated discharging funnels and the metering gates 207 and 208, which can be operated independently of one another. The heat-carrying medium exiting from the reformer 205 is not processed via the separation stage 203. However, the heat-carrying medium that has passed through the pyrolysis reactor 202 and has been separated from the pyrolysis coke in the separation stage 203, and the heat-carrying medium that has passed through the reformer 205, each are jointly transported in the conveying device 209 into the preheater 206. However, as far as the raw product gas stream 210 and the exhaust gas stream 211 downstream of the preheater 206 are concerned, everything remains the same as in the series connection of the arrangement shown in FIG. 1, so that the representation of the parallel circuit can be discontinued at this point.

Figure 3:
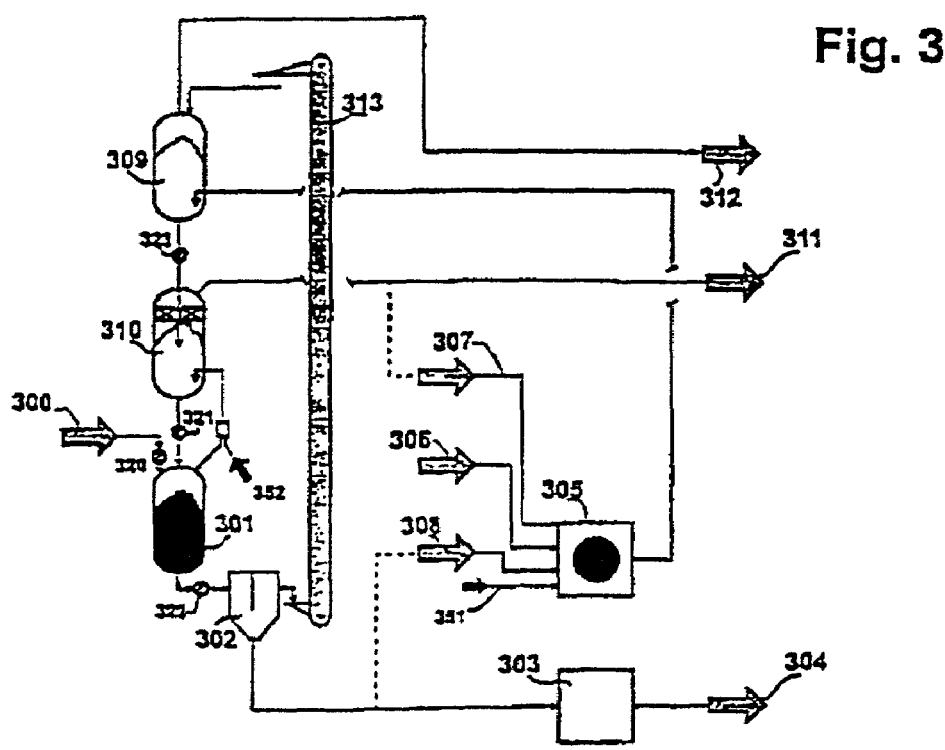
FIG. 3 shows a further embodiment according to the present invention.

FIG. 3 shows, in a highly simplified manner, a special case of application of the method as defined by the invention with the help of the example of the series circuit shown in FIG. 1, whereby said case of application is functioning in the parallel circuit shown in FIG. 2 in a corresponding manner. In the present embodiment, the charged stock material 300 enters the pyrolysis reactor 301 in the usual way and passes through the latter while the pyrolysis coke is being formed. However, in the present case, the latter is separated from the heat-carrying medium in the separation stage 302, and then extracted from the process as the usable coke 304 via the cooling and conditioning stage 303, and subsequently used further in any desired way. In the present case, the stage 303 may be a changing vessel put under vacuum, but also a device used for dry quenching of the coke. The firing product 305 is now burnt with at least one of the fuels for the purpose of heating up the heat-carrying medium, using a foreign fuel 306 or a partial stream 307 of the product gas, or a partial stream 308 of the pyrolysis coke. However, the fuel 306 may be a partial stream of the charged material 300 as well, provided the latter can be fired. This is important especially in the start-up phase of a plant operating according to the method as defined by the invention. A great number of gaseous, liquid or solid fuels are considered otherwise. If, for example, the product gas is to be used as a reducing agent in a smelting process, stack gas or some other weak gas can be employed as the fuel 306. In the cases described in FIG. 3, the site of the firing 305 is no longer necessarily located within the direct proximity of the separation stage 302, but can be shifted to about the direct vicinity of the heating-up zone 309. This will not affect either the reformer 310 or the quality of the product gas 311 and the further treatment of the exhaust gas 312. FIG. 3 shows, furthermore, the conveyor system for the heat-carrying medium 313; the charging gate for feeding the stock material 320; the gate located between the reformer and the pyrolysis reactor 321; the extraction gate for the extraction from the pyrolysis reactor 322; the gate located between the heating-up zone and the reformer 323; the combustion air stream 351; as well as the process steam stream 352.

Example of Implementation of the Method:

200 kg/h (afro) timber, i.e. 286 kg/h air-dried timber with a 30% moisture content is gasified in the device according to FIG. 1. The timber is assumed to contain 2% ash (anhydrous) and otherwise substantially 50% carbon, 6% hydrogen, 42% oxygen, and 1.9% nitrogen, calculated free of water and ash. The lower calorific value is assumed to amount to 18.0 MJ/kg in the anhydrous state. The thermal gasification capacity is assumed to consequently amount to 1,000 kW. The pyrolysis is assumed to be carried out at 550° C. and the reforming step to be carried out with steam at 950° C. The atmospheric pressure is the operating pressure.

Steel balls with a grain size of about 10 mm are employed as the heat-carrying medium. The heat-carrying medium is first heated from 500° C. to 950° C. Because of the heat capacity of 251 kW required for the pyrolysis and the reforming stages, as well as for covering heat losses, the circulating amount of the heat-carrying medium amounts to 4,300 kg/h, and thus comes to 21.5 times the amount of timber charged. The pyrolysis reactor is a brick-lined shaft with a clear cylindrical height of 1.3 m and an inside diameter of 0.9 m, so that the pyrolyzing migrating bed is safely provided with a dwelling time of 0.5 hour available to it. In the course of the pyrolyzing process, the timber is reacted in such a way that 20 percent by mass of the dry substance of the timber is left over as pyrolysis coke, thus 42 kg/h. Said pyrolysis coke has an ash component of 9.5% and contains 92.2% carbon, 2.6% hydrogen, and 5.2% oxygen on an anhydrous and ash-free basis. The calorific value amounts to 29.1 MJ/kg. The reforming process takes place at 950° C. in a fill of the heat-carrying medium having a clear cylindrical height of 0.9 m and a clear diameter of 0.7 m, so that a gas dwelling time of 0.5 second is safely maintained. The following product gas is obtained in this way:

| | |
|---|---|
| Calorific value | 9.10 MJ/kg, dry |
| Hydrogen | 59.7% by vol., dry |
| Carbon monoxide | 17.0% by vol., dry |
| Methane | 1.4% by vol, dry |
| Carbon dioxide | 21.9% by vol., dry |
| Steam | 24.8% by vol. |
| Quantity | 402 Nm³/h |
| Chemical enthalpy current | 765 kW. |

The enthalpy current of the pyrolysis coke in the firing stage amounts to 341 kW. The heat for the reforming stage, the pyrolysis, the waste water evaporation from the product gas cooling stage, and for covering the heat losses is generated in this way, and the combustion air required in the firing stage is heated to 350° C. The degree of efficiency of the firing process amounts to 80.1%; the loss of exhaust gas consequently comes to 68 kW. The sensible heat of the product gas amounts to 168 kW, with which about 145 kg/h of a saturated steam with low pressure can be generated, whereof 50 kg/h is required as process steam in the reforming stage, while the remainder can be used in some other way.

(1) U.S. Pat. No. 4,568,362
(2) DE-PS 197 55 693
(3) M. Steseng, A. Jensen, K. Dam-Johansen, M. Gronil: Experimental Investigation and Kinetic Modelling of Biomass Pyrolysis; Proc. $2^{nd}$ Olle Lindström Symposium, Stockholm Jun. 8 to 11, 1999, pp 97–104.

LIST OF REFERENCE NUMERALS

101 Charged material
102 Conveyor system for charged material
103 Gate
104 Pyrolysis reactor
105 Firing stage
106 Gate
107 Second reaction zone (reformer)
108 Separate conduit for volatile components
109 Admitted process steam
110 Heat-carrying medium
111 Catalyst
112 Product gas stream
113 Of-heat vessel
114 Purifying and conditioning stage
115 Ventilator
116 Purified product gas stream
117 Heating-up zone (=preheater)
118 Gate
120 Gate and conveyor unit
121 Separation stage
122 Pyrolysis coke stream
123 Hot gas conduit
124 Conveying element
125 Air preheater (LUVO)
126 Purification stage
127 Suction exhaust blower
151 Low-temperature heat
152 Vapors
153 Condensation product stream
154 Fresh water
155 Combustion air
156 Ash/slag stream
157 Purified exhaust gas
158 Partial stream of purified gas
201 Charge material
202 Pyrolysis reactor
203 Separation stage
204 Firing
205 Reformer
206 Preheater
207 Metering gate
208 Metering gate
209 Conveying element
210 Raw product gas stream
211 Exhaust gas stream
251 Combustion air
300 Charged material
301 Pyrolysis reactor
302 Separation stage
303 Cooling and conditioning stage
304 Usable coke
305 Firing
306 Foreign fuel
307 Product gas
308 Partial stream of pyrolysis coke
309 Heating-up zone (=preheater)
310 Reformer
311 Product gas
312 Exhaust gas
313 Conveyor system for heat-carrying medium
320 Charging gate for feeding the charged material
321 Gate between reformer and pyrolysis reactor
322 Extraction gate from extraction from pyrolysis reactor
323 Gate between heating-up zone and reformer
351 Combustion air stream
352 Process steam stream.

What is claimed is:

1. A method for gasifying organic substances and substance mixtures, in connection with which the organic substances are split in a pyrolysis reactor through contact with a hot heat-carrying medium into a carbon-containing residue and pyrolysis gases; and the solid, carbon-containing residue is supplied to a firing stage and burned there, whereby at least proportions of the liberated heat are used for heating up the heat-carrying medium; and the pyrolysis gases, after adding a reactant steam in a second reaction zone, and with the use of at least a portion of the heat liberated in the firing stage, are after-heated through indirect heat exchange in such a way that a product with a high calorific value is obtained, comprising the steps of (a) separating the heat-carrying medium, upon exiting from the pyrolysis reactor, from the solid, carbon-containing residue in a separation stage and supplying it to a heating-up zone;

(b) burning the solid, carbon-containing residue in a firing stage;

(c) passing the hot exhaust gases of the firing stage into the heating-up zone through a fill of the heat-carrying medium, whereby they transfer a large part of their sensible heat to the heat-carrying medium;

(d) extracting the heated-up heat-carrying medium from the heating-up zone into the second reaction zone designed in the form of a migrating bed reactor, where the mixture comprised of pyrolysis gases and reactant is heated up and converted into the product gas; and (e) recycling the heat-carrying medium into the pyrolysis reactor after passing through the second reaction zone.

2. The method according to claim 1,
wherein the reaction of pyrolysis gases with the steam is carried out in the presence of a catalyst.

3. The method according to claim 1,
wherein the heat-carrying medium consists of refractory substances comprising sand, gravel, split, aluminosilicate, corundum, graywacke, quartzite, or cordierite.

4. The method according to claim 1,
wherein the heat-carrying medium consists of shaped bodies of metallic materials, and among such materials are magnetic materials or non-metallic ceramic materials, and also sintered materials or iron ore pellets.

5. The method according to claim 1,
wherein the totality of the heat-carrying medium used consists at least partly of a material that is catalytically active in the second reaction zone.

6. The method according to claim 1,
wherein the separation of the heat-carrying medium from the solid, carbon-containing residue is carried out mechanically upon exiting from the pyrolysis reactor via a single- or multi-stage screening stage.

7. The method according to claim 1,
wherein the separation of the heat-carrying medium from the solid, carbon-containing residue upon exiting from the pyrolysis reactor is carried out magnetically.

8. The method according to claim 1,
wherein the separation of the heat-carrying medium from the solid, carbon-containing residue is carried out upon exiting from the pyrolysis reactor pneumatically with the help of wind sifting, and that the sifting medium is air, or combustion air for the firing stage, or exhaust gas, or exhaust gas recycled from the firing stage.

9. The method according to claim 1,
wherein a portion of the pyrolysis gases or of the product gas is burnt in the firing stage for the carbon-containing residue, or in a separate firing stage, and the heat liberated in said stage is used in the pyrolysis and in the second reaction stage.

10. The method according to claim 1,
wherein a portion of the solid, carbon-containing residue is recycled into the pyrolysis or the second reaction zone separately or together with the heat-carrying medium.

11. The method according to claim 1,
wherein at least one of the following media is conveyed discontinuously or in batches when exiting from the pyrolysis reactor: organic substance; heat-carrying medium;
solid, carbon-containing residue; mixture of heat-carrying medium and solid, carbon-containing residue.

12. The method according to claim 1,
wherein the sensible heat of the product gas and the exhaust gas of the firing stage is at least partially used for generating the steam as the reactant, or for preheating the air for the firing stage.

13. The method according to claim 1,
wherein the sensible heat of the product gas and the exhaust gas of the firing stage is at least partially used for heating up the organic substance directly or indirectly.

14. The method according to claim 1,
wherein after passing through the heating-up zone, the heat-carrying medium is divided in a part passing through the second reaction zone, and a part directly used in the pyrolysis reactor; and that the heat-carrying medium having passed through the second reaction zone, is passed on into the pyrolysis reactor, or is added to the remaining heat-carrying medium downstream of the pyrolysis reactor.

15. The method according to claim 1,
wherein the reactant, steam is admitted into the pyrolysis reactor at any desired point, in a site located as closely as possible to the discharge of the mixture consisting of the heat-carrying medium and the solid, carbon-containing residue.

16. The method according to claim 1,
wherein a solid, liquid or gaseous fuel is at least partly used in the firing stage, such fuel neither being the material charged nor being formed at any point within the course of the process from said charged product or from any of its subsequent products.

17. The method according to claim 1,
wherein at least a partial stream of the solid, carbon-containing residue produced in the pyrolysis reactor is discharged and not burnt in the firing stage.

18. The method according to claim 1,
wherein the material charged is at least partially directly used as fuel in the firing stage.

19. The method according to claim 1,
wherein in addition to the heat-carrying medium, a highly basic, solid substance, calcium oxide, calcium hydroxide or calcium carbonate is passed through the pyrolysis reactor, said substance being subsequently separated from the heat-carrying medium as well, and being passed either through the firing stage or directly discharged into the outside.

20. The method according to claim 1,
wherein the product gas is cooled and the condensation product formed in the cooling process is purified, and reused for generating the process steam, or added to the firing stage, or prior to the firing process, is added to the carbon-containing residue for the purpose of evaporation and combustion of the combustible components contained therein.

* * * * *